Jan. 12, 1926.  
A. W. HUTCHISON  
1,569,020  
CONTROL FOR AN OIL BURNER FEED  
Filed Feb. 5, 1925
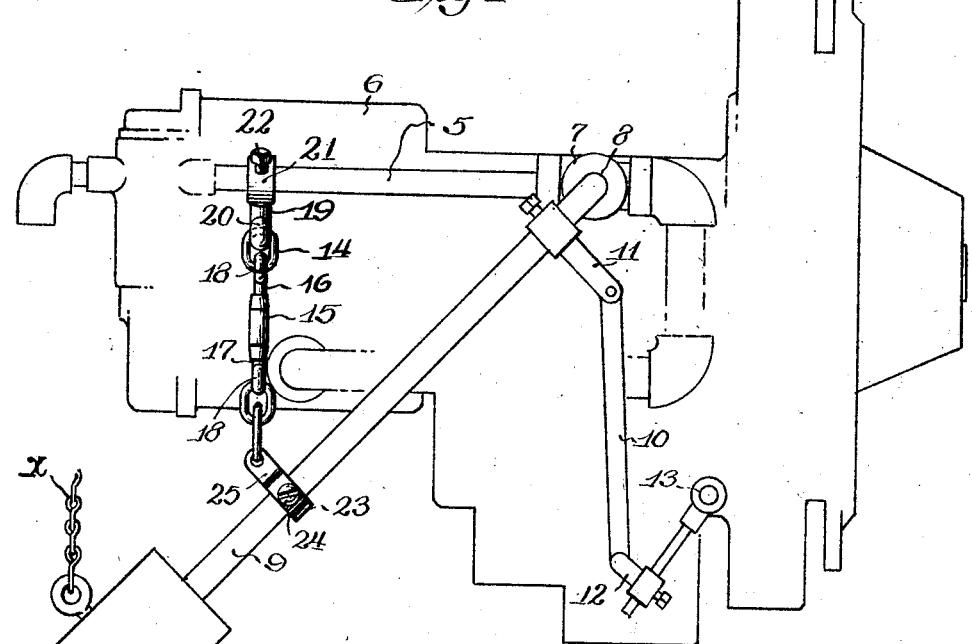
INVENTOR  
ALFRED W. HUTCHISON.  
ATTY Patented Jan. 12, 1926.

1,569,020

UNITED STATES PATENT OFFICE.

ALFRED W. HUTCHISON, OF CHICAGO, ILLINOIS.

CONTROL FOR AN OIL-BURNER FEED.

Application filed February 5, 1925. Serial No. 6,995.

*To all whom it may concern:*

Be it known that I, ALFRED W. HUTCHISON, a citizen of the United States, and a resident of Chicago, in the county of Cook and State of Illinois, have invented certain new and useful Improvements in a Control for an Oil-Burner Feed, of which the following is a full, clear, and exact description, such as will enable others skilled in the art to make and use the same.

My invention relates generally to the regulation and control of the feed of the fuel in oil burners used for heating purposes. More particularly my present structure has reference to a safety device that is employed to prevent the accidental shut-off of the fuel.

In certain types of oil burners the control of the fuel is accomplished through the instrumentality of a regulator valve that is operated by means of a weighted or gravity actuated lever. This lever is released by a thermostat or by a timed regulator which will cause the lever to operate the valve. When, however, the apparatus has been set to reduce the flow to a minimum, it frequently happens that the lever will gravitate too far or past the dead center of the lever system connected to it and as a result the flow of fuel is entirely cut-off, and when the lever is subsequently elevated to increase the fuel flow the structure will become flooded. This will cause serious damage and greatly increases the fire-hazard due to the fact that the pilot light may have become extinguished from lack of fuel.

With my structure the contingencies above alluded to cannot arise because of the fact that I provide means that will absolutely prevent the closing off of the fuel flow, and due to the fact that minute adjustment may be made with my device the flow of fuel may be reduced to the very smallest stream without danger of being shut off.

Several of the objects of my invention reside in providing means that will accomplish the above-mentioned functions in a dependable manner; that is easy and simple to regulate or adjust; that may be readily attached to an oil burner already in use; and which is made from a few simple parts that may be quickly and economically assembled so that the article may be manufactured and sold for a moderate price. Other objects are to provide a device that is novel and dependable in construction and operation, is not complicated, and which is of a sturdy character.

I prefer to accomplish the before mentioned objects and carry out my invention in substantially the manner hereinafter fully described, reference being made to the accompanying drawings that form a part of this specification in which,—

Fig. 1 is an elevation of an oil burner showing the manner of installing my control device thereon.

Fig. 2 is a detached view, enlarged, of one form of my invention.

In the drawings, I have employed similar reference characters to designate like parts wherever the same occur throughout the several views.

In Figure 1 a feed or supply pipe 5 for the oil or other liquid fluid extends alongside a portion of the casing or housing 6 to the nozzle or atomizer where the oil is discharged and interposed in this pipe is a regulator valve 7. The spindle 8 of this valve is usually horizontal and extends out of the same and is bent laterally or has secured to it an elongated regulator lever 9 on which is provided an adjustable weight that may be moved to divers positions along the lever according to the adjustment desired. Connected with this lever 9 by a link 10 and suitable levers 11 and 12, is a valve 13 that controls the flow of air to the atomizer so that the action of the valves 7 and 13 are synchronized in operation. A chain $x$ or the like maintains the lever 9 in a raised portion through the medium of suitable control mechanism (not shown) and when released the lever will drop by gravity and shut down the flow of oil to a minimum. It not infrequently occurs that the lever will drop too far and will entirely shut off the flow of fuel as well as cut off the air through valve, 13, so that the structure becomes flooded and liable to become ignited when the lever is subsequently raised to a position to permit the normal flow to be again restored. It is to prevent this overbalancing of the lever that I have devised the structure herein disclosed, one of which is detailed in Figure 1 and will now be described. In this structure I have provided a chain 14 in which is interposed an adjusting device or turn-buckle consisting of an elongated slotted body 15 that is axially bored at its opposite ends and tapped with right and left hand screw-threads. Screwed into these bores are correspondingly threaded shanks 16 and 17 each having an eye 18 at its end to receive an adjacent link of the chain 14. At the upper end of the chain I provide an arm or bracket 19 having an apertured enlargement 20 at one end with which the chain is connected, and at its opposite end is a bifurcated head 21 of sufficient dimensions to be engaged transversely with the fuel pipe 5. One of the arms of the bifurcation is bored and tapped to receive a set-screw or bolt 22 so that after the bracket or arm has been placed on the pipe 5 the set-screw may be turned in to securely fasten the bracket in place. At the opposite end of the chain is an attaching device in the form of an annulus or collar 23, through which the lever 9 is inserted that is transversely bored and tapped to receive a set-screw 24 for securing the annulus on said rod, and extending from the edge of the collar is an eye 25 the axis of which is transverse to the axis of the collar and is adapted to have one of the links of the chain passed through it.

The bracket arm is mounted in a horizontal plane upon the fuel feed pipe as seen in Figure 1 and the turn-buckle adjusted to the position that will permit the lever to drop and maintain the valve open to the smallest extent. Thus the gravitation of the lever is arrested before it reaches a lowered position where the fuel would be entirely cut off.

It will be understood from the foregoing that divers refinements and modifications of the structure herein disclosed may be made without materially departing from the principles involved, and I therefore desire it understood that all such changes are included within the scope of the appended claims in so far as the prior art will permit.

What I claim is:—

1. In an oil burner structure a fuel feed pipe, a valve therein, a regulator lever extending from said valve and movable in a vertical plane alongside said pipe, and means connecting said pipe and lever at a point remote from said valve, said means consisting of a chain connected at opposite ends respectively to said pipe and said lever, and a device for adjusting the length of said chain whereby said lever is supported in divers lowered positions.

2. In an oil burner structure a fuel feed pipe, a valve therein, a gravity-lowered lever for operating said valve and movable in a plane adjacent said pipe, a chain, extending between said pipe and said lever, devices at opposite ends of said chain for removably connecting the same to said pipe and lever, and means for adjusting the length of said chain whereby said lever is supported at divers distances from said pipe to control the position of said valve.

Signed at Chicago, in the county of Cook, and State of Illinois, this 30th day of January, 1925.

ALFRED W. HUTCHISON.